US012576755B2

(12) United States Patent
Lee et al.

(10) Patent No.: US 12,576,755 B2
(45) Date of Patent: Mar. 17, 2026

(54) WALK-IN APPARATUS OF VEHICULAR SEAT

(71) Applicant: Hyundai Transys Inc., Seosan-si (KR)

(72) Inventors: Jung Bin Lee, Hwaseong-si (KR);
Sang Min Kim, Hwaseong-si (KR);
Jun Kyu Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 154 days.

(21) Appl. No.: 18/592,828

(22) Filed: Mar. 1, 2024

(65) Prior Publication Data

US 2024/0294098 A1 Sep. 5, 2024

(30) Foreign Application Priority Data

Mar. 2, 2023 (KR) ........................ 10-2023-0027821

(51) Int. Cl.
B60N 2/20 (2006.01)
B60N 2/02 (2006.01)
B60N 2/12 (2006.01)
B60N 2/90 (2018.01)
(52) U.S. Cl.
CPC ........... B60N 2/12 (2013.01); B60N 2/02253 (2023.08); B60N 2/919 (2018.02); B60N 2002/952 (2018.02)

(58) Field of Classification Search
CPC . B60N 2/20; B60N 2/206; B60N 2/30; B60N 2/3011; B60N 2/3047; B60N 2/3054
See application file for complete search history.

(56) References Cited

U.S. PATENT DOCUMENTS

2017/0001546 A1* 1/2017 Keyser ................. B60N 2/2227
2019/0152352 A1 5/2019 Handigol et al.

FOREIGN PATENT DOCUMENTS

| JP | 4459124 | B2 | 4/2010 |
| JP | 4605477 | B1 | 1/2011 |
| KR | 10-2017-0056744 | A | 5/2017 |
| KR | 10-2223457 | B1 | 3/2021 |
| KR | 10-2022-0077489 | A | 6/2022 |

* cited by examiner

*Primary Examiner* — Timothy D Collins
*Assistant Examiner* — Terri L Filosi
(74) *Attorney, Agent, or Firm* — Bridgeway IP Law Group, PLLC; Jihun Kim

(57) ABSTRACT

A walk-in apparatus includes an actuator driven by manipulation of a walk-in manipulation unit of a user; a folding unit actuated by the actuator and folding a seat back forward; a tilting unit interlocking with the actuation of the folding unit and tilting a rear side of the seat; and a sliding unit interlocking with the tilting unit and moving the seat forward.

9 Claims, 15 Drawing Sheets

WALK-IN APPARATUS OF VEHICULAR SEAT

CROSS-REFERENCE TO RELATED APPLICATIONS

This application claims priority to and the benefit of Korean Patent Application No. 10-2023-0027821 filed in the Korean Intellectual Property Office on Mar. 2, 2023, the entire contents of which are incorporated herein by reference.

TECHNICAL FIELD

The present invention relates to a walk-in apparatus of a vehicular seat.

BACKGROUND ART

In an RV vehicle, or a 3-door type vehicle, some seats have a walk-in function to get on and off rear seat passengers.

The walk-in function of the seat is a function in which when a passenger on a rear seat manipulates a walk-in lever of a front seat in a state in which the passenger is set to sit, a seat back is folded forward at a predetermined angle as illustrated in FIG. 1, or the seat slides forward by a predetermined distance while the seat back is tilted as illustrated in FIG. 2, and refers to a function for the passenger on the rear seat to easily get on and off by securing a space between a front seat and the rear seat through the function.

Meanwhile, in the walk-in apparatus, in the related art, a walk-in memory apparatus is proposed which allows the memory module to store a walk-in operation point while being suspended on a walk-in rail when the seat is moved forward by walk-in, if a lock member dragging the memory module is unlocked from the memory module.

However, the walk-in apparatus has a problem in that a locking structure of the memory module and the lock member, and a structure of the memory module for a memory function are also configured to be complex, so cost and weight of the apparatus increase.

SUMMARY OF THE INVENTION

The present invention is contrived to solve a problem of a background art, and has been made in an effort to provide a walk-in apparatus which has a mechanically simple configuration, and has an improved structure so as to achieve tilting and sliding simultaneously only by button manipulation of a user.

An exemplary embodiment of the present invention provides a walk-in apparatus provided in a vehicular seat, which includes: an actuator driven by manipulation of a walk-in manipulation unit of a user; a folding unit actuated by the actuator and folding a seat back forward; a tilting unit interlocking with the actuation of the folding unit and tilting a rear side of the seat; and a sliding unit interlocking with the tilting unit and moving the seat forward.

In an exemplary embodiment, folding unit may include a first lever rotated by a first cable connected to the actuator and releasing folding restriction of a recliner provided in the seat back.

The recliner may include a spring providing force of folding the seat back.

In an exemplary embodiment, the tilting unit may include a second lever being in contact with one end of the first lever and rotated by the rotation of the first lever, a second cable pulled by the rotation of the second lever, and a third lever connected to the second cable and rotated when the second cable is pulled, and tilted as a rear side of the seat is separated from a latch by the rotation of the third lever.

Further, a pair of third levers may be provided at left and right sides of the seat, and the other end of the second cable of which one end is connected to the second lever may be branched to correspond to the third lever.

In an exemplary embodiment, the tilting unit may further include a fourth lever being in contact with one end of the third lever, and rotated by the rotation of the third lever, and decoupled from the latch, a switch actuated by rotation of the fourth lever, and a motor driven by the switch and tilting the seat.

In addition, the seat may be driven by the motor, and may include a first link of which one end is rotatably coupled to a front side of the movable rail and the other end is coupled to a front lower portion of the seat, and a second link of which one end is rotatably coupled to a rear side of the movable rail and the other end is coupled to a rear lower portion of the seat.

In an exemplary embodiment, the sliding unit may include a front pressing unit pressing the movable rail to which the seat is coupled to slide to a front which is a driving direction of a vehicle, a sliding restriction means restricting the sliding of the movable rail, a fifth lever interlocking with the first link or the second link, and a sixth lever interlocking with the fifth lever and releasing sliding restriction by the sliding restriction means.

Further, the sliding restriction means may include restriction grooves formed at a predetermined interval in a longitudinal direction of a fixed rail in which the movable rails slides, and a seventh lever including restriction protrusions inserted and coupled into the restriction grooves, and rotatably coupled to the movable rail, and the seventh lever may rotate in a direction in which the restriction protrusions of the seventh lever depart from the restriction grooves by the rotation of the sixth lever to release the sliding restriction.

Further, when the switch is turned on, the actuator is driven to release pulling force applied to the first cable.

In an exemplary embodiment, the walk-in apparatus may further include a third cable of which one end is coupled to the sixth lever and the other end is coupled to the seventh lever, and the seventh lever may rotate as the third cable is pulled by the rotation of the sixth lever.

According to an exemplary embodiment of the present invention, a walk-in apparatus can be provided, which has a mechanically simple configuration, and has an improved structure so as to achieve tilting and sliding simultaneously only by button manipulation of a user.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
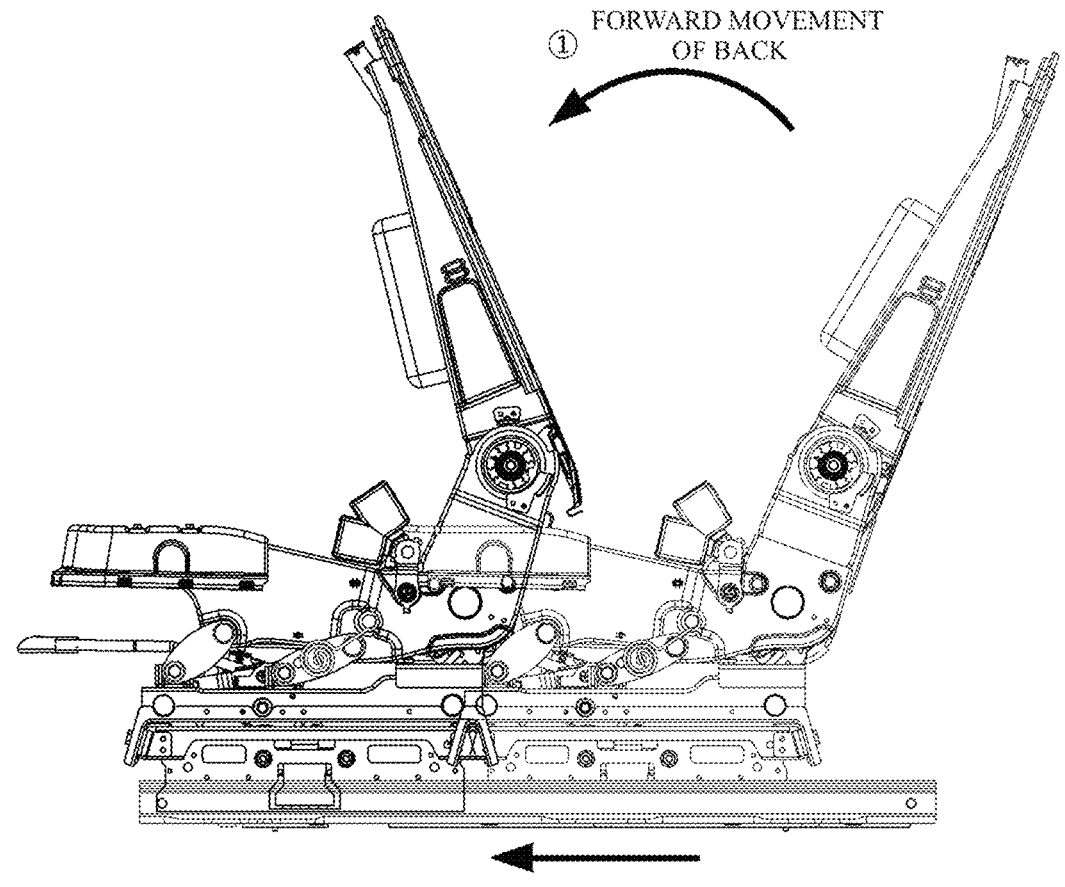
FIGS. 1 and 2 are diagrams describing an operation of a walk-in apparatus in the related art.
Figure 2:
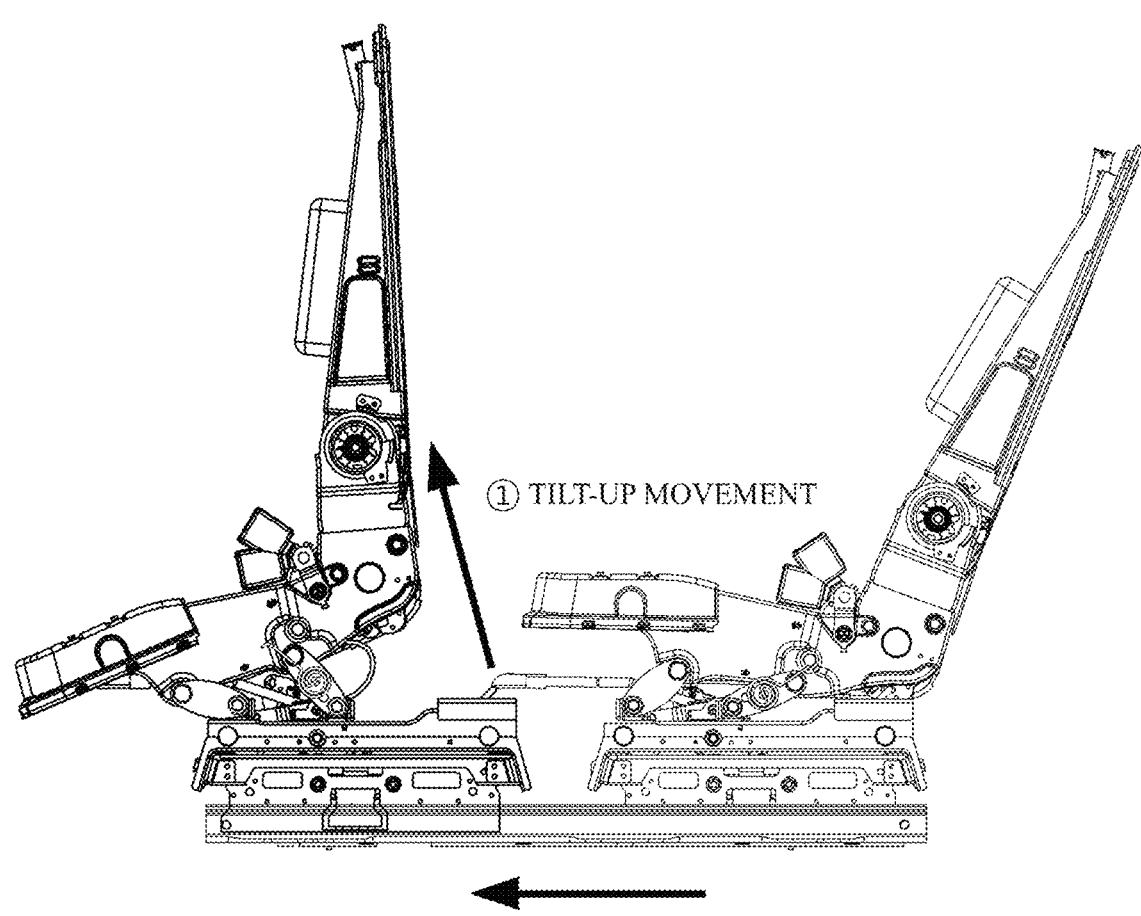

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Figure 3:
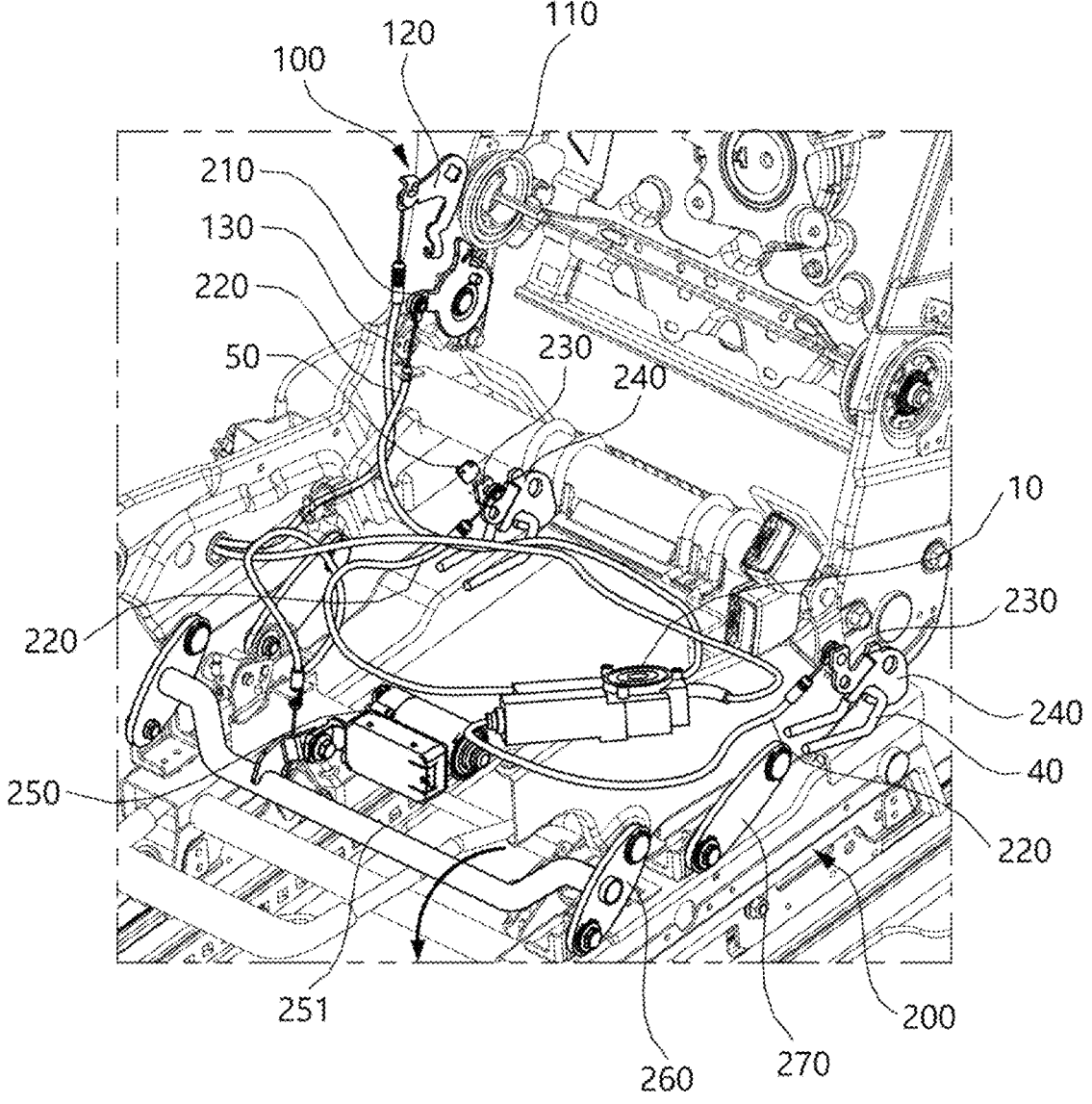
FIG. 3 is a diagram describing a walk-in apparatus according to an exemplary embodiment of the present invention.
Figure 4:
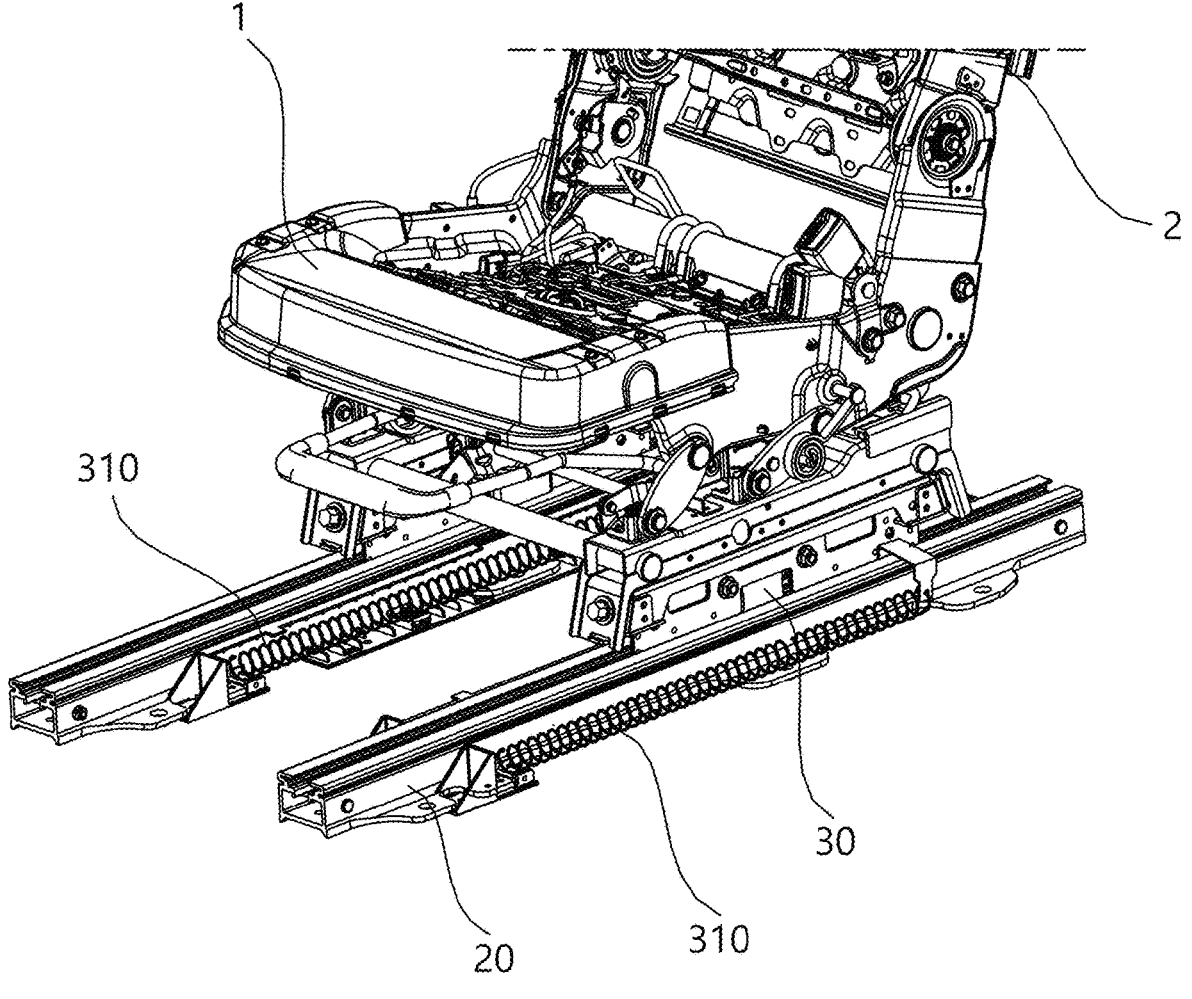
FIG. 4 is a diagram describing a relationship between a fixed rail and a movable rail, and a seat.
Figure 5:
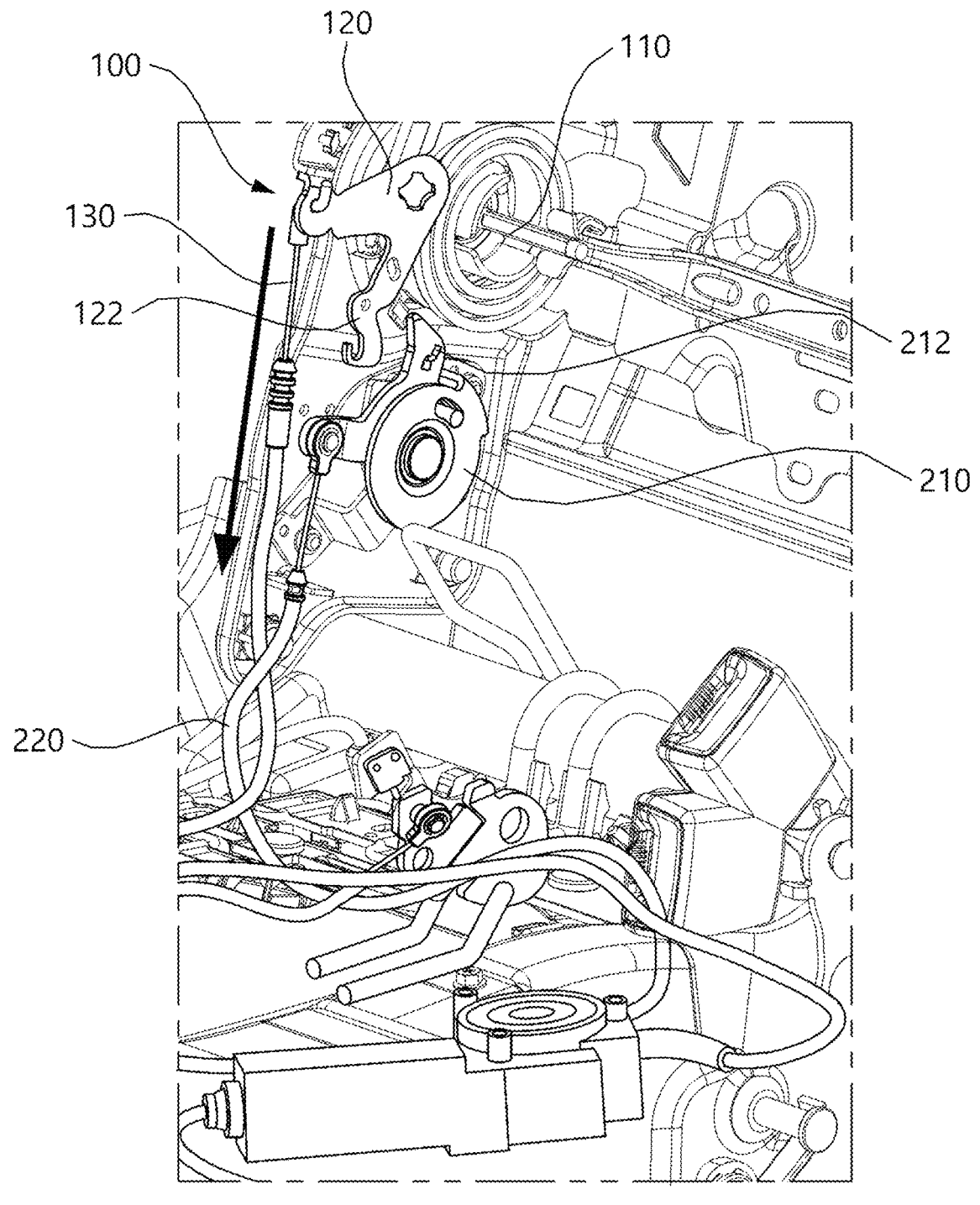
FIG. 5 is a diagram describing rotation of a first lever by driving of an actuator and the resulting folding of a seat back.
Figure 6:
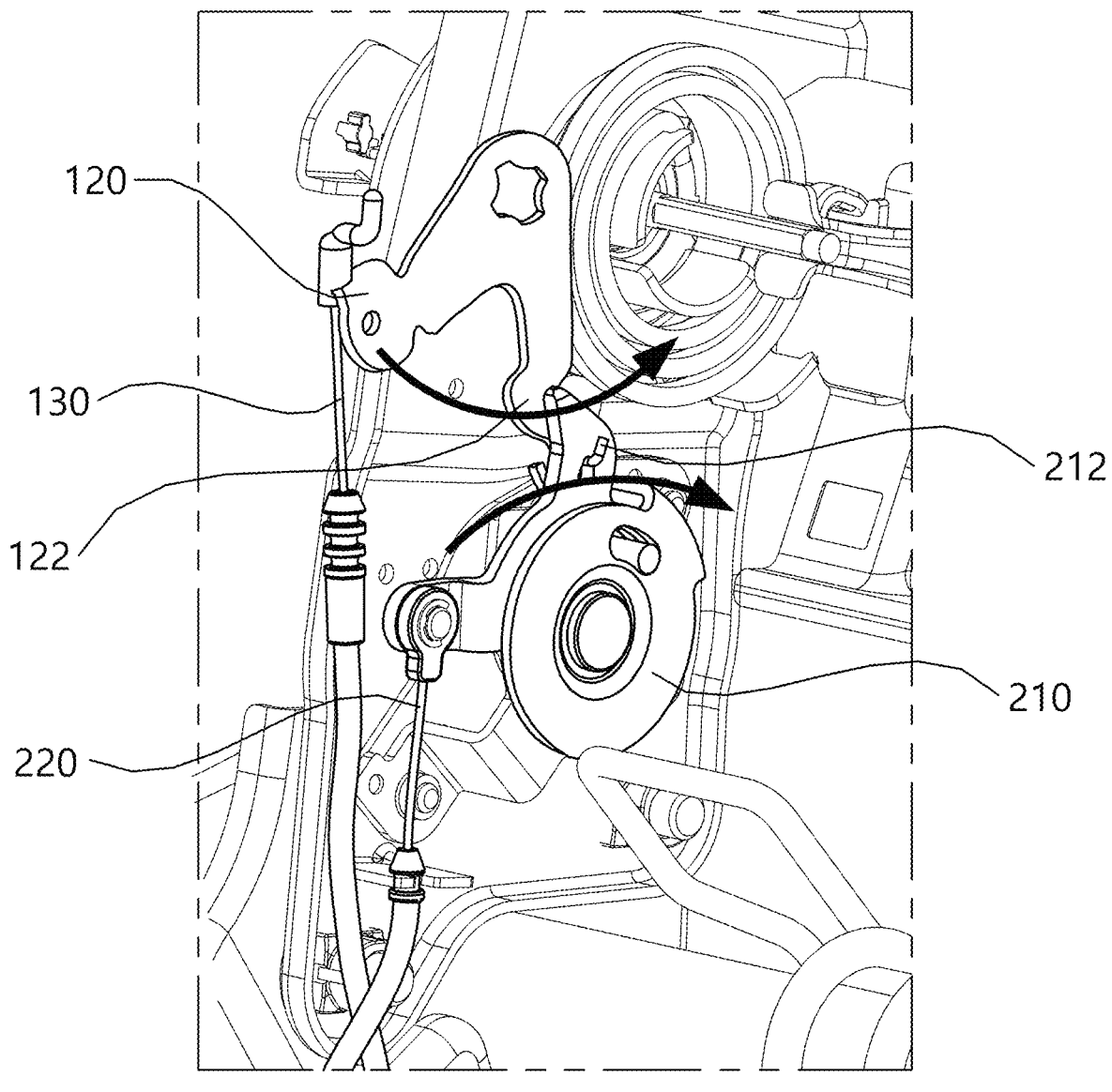
FIG. 6 is a diagram describing rotation of a second level and pulling of a second cable by the ration of the first level.
Figure 7:
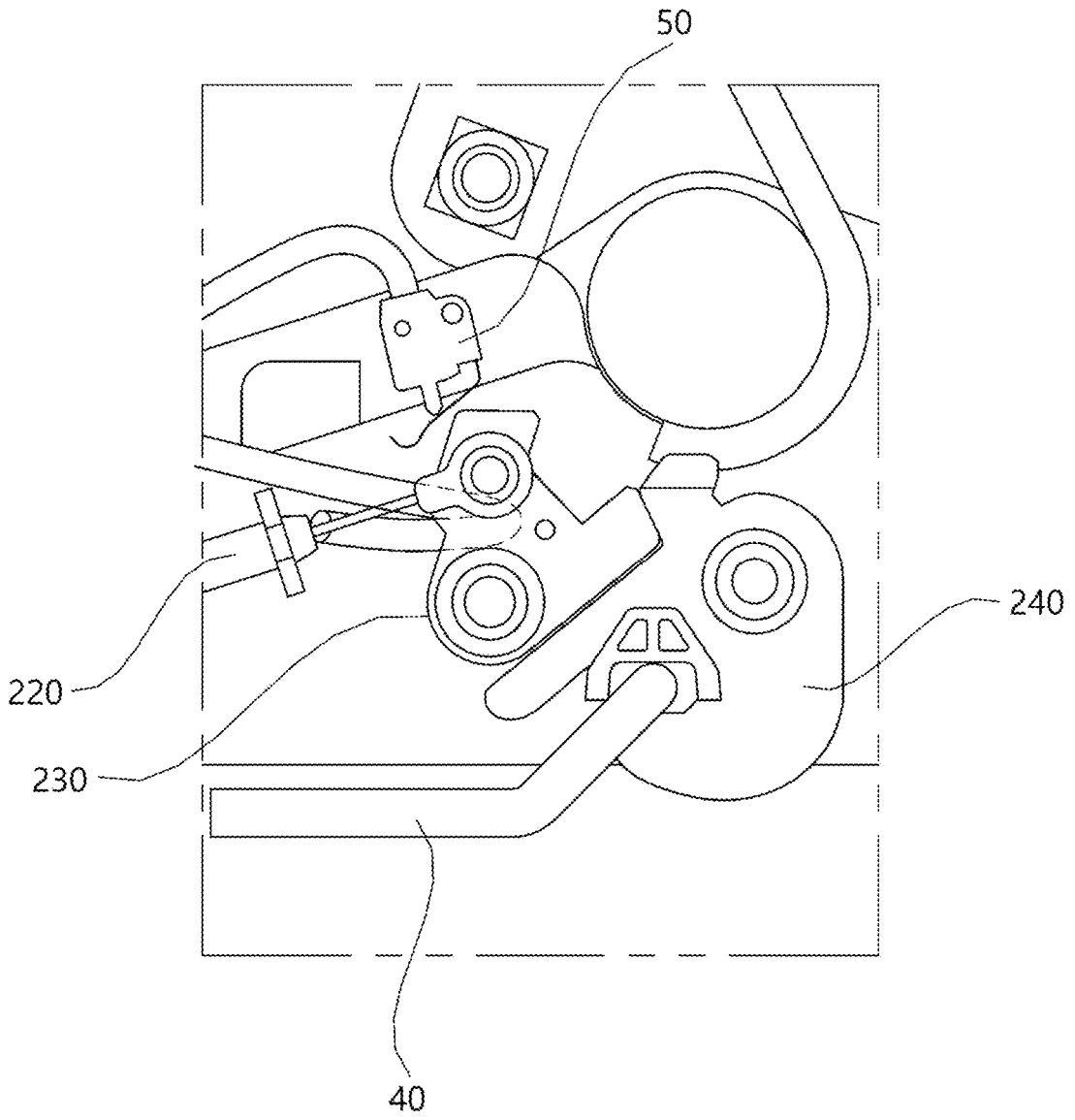
FIG. 7 is a diagram describing rotation of a third lever and actuation of a switch by a second cable.
Figure 8:
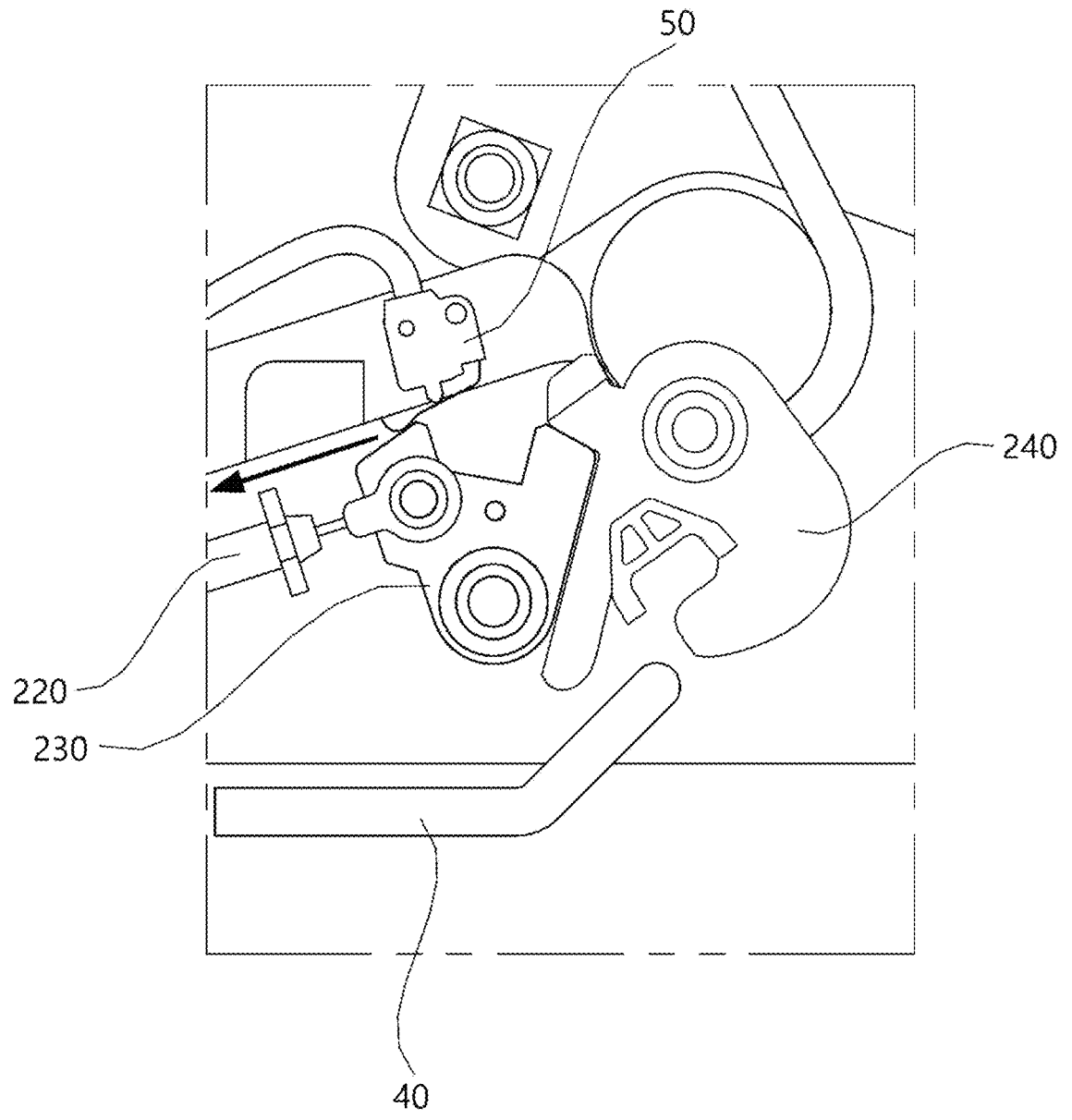
FIG. 8 is a diagram illustrating a state in which a fourth lever is decoupled from a latch by the rotation of the third lever.
Figure 9:
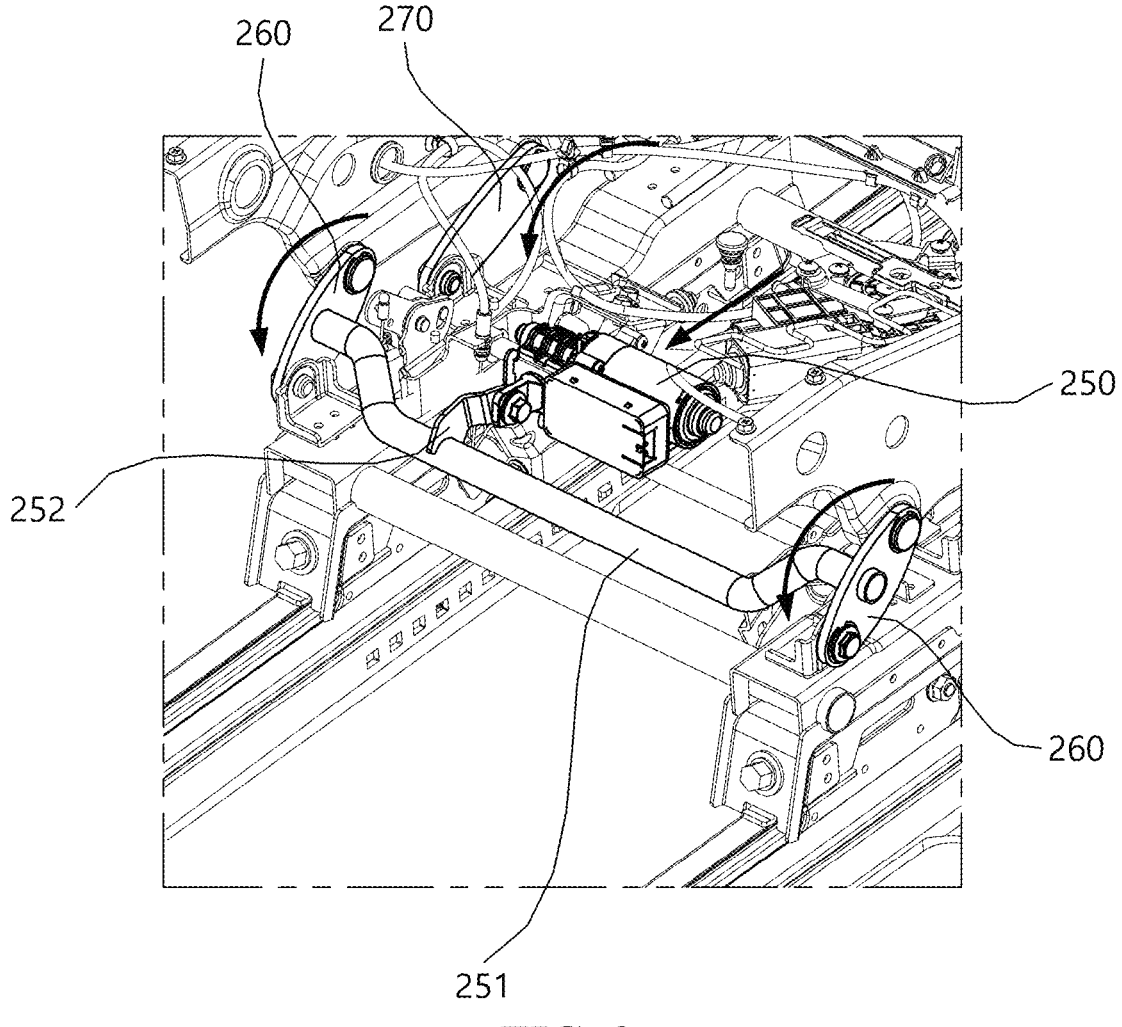
FIGS. 9 and 10 are diagrams describing motions of a first link and a second link by driving of a motor.
Figure 10:
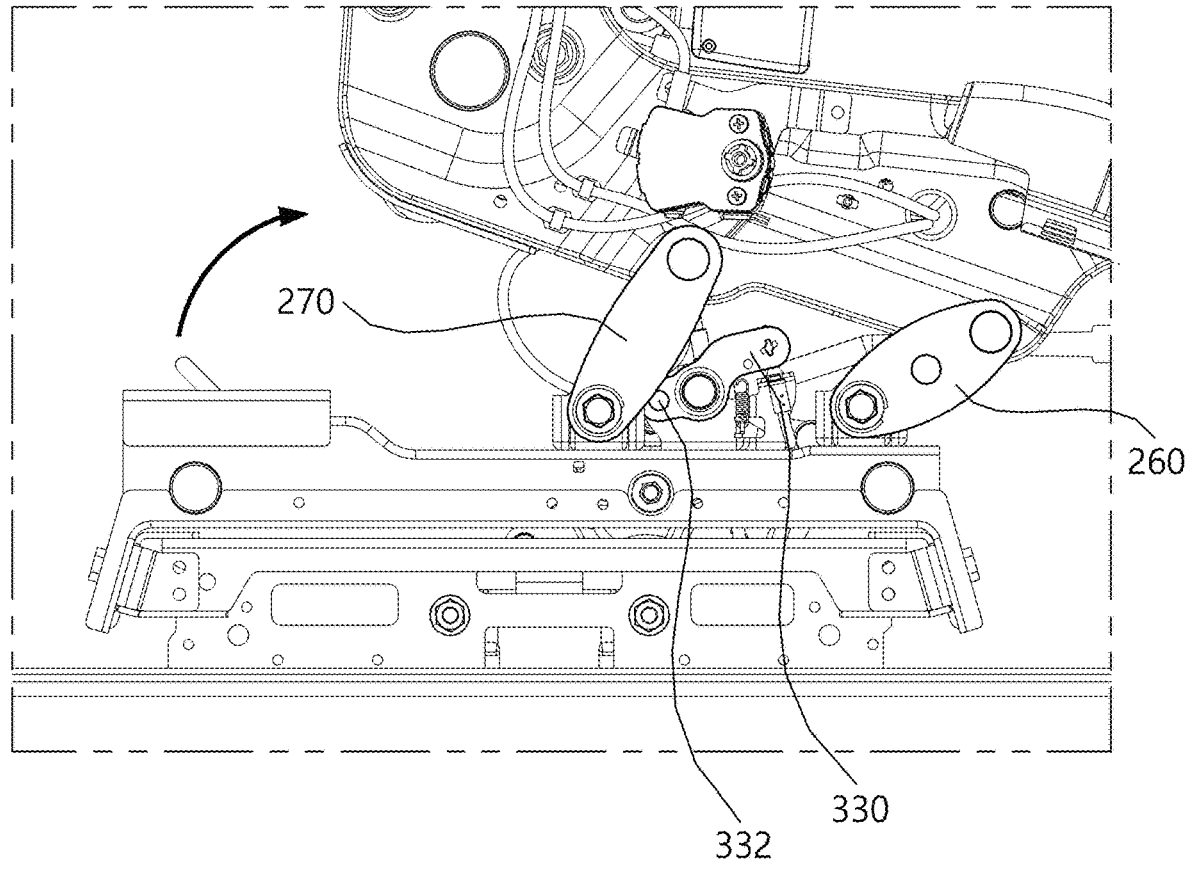
Figure 11:
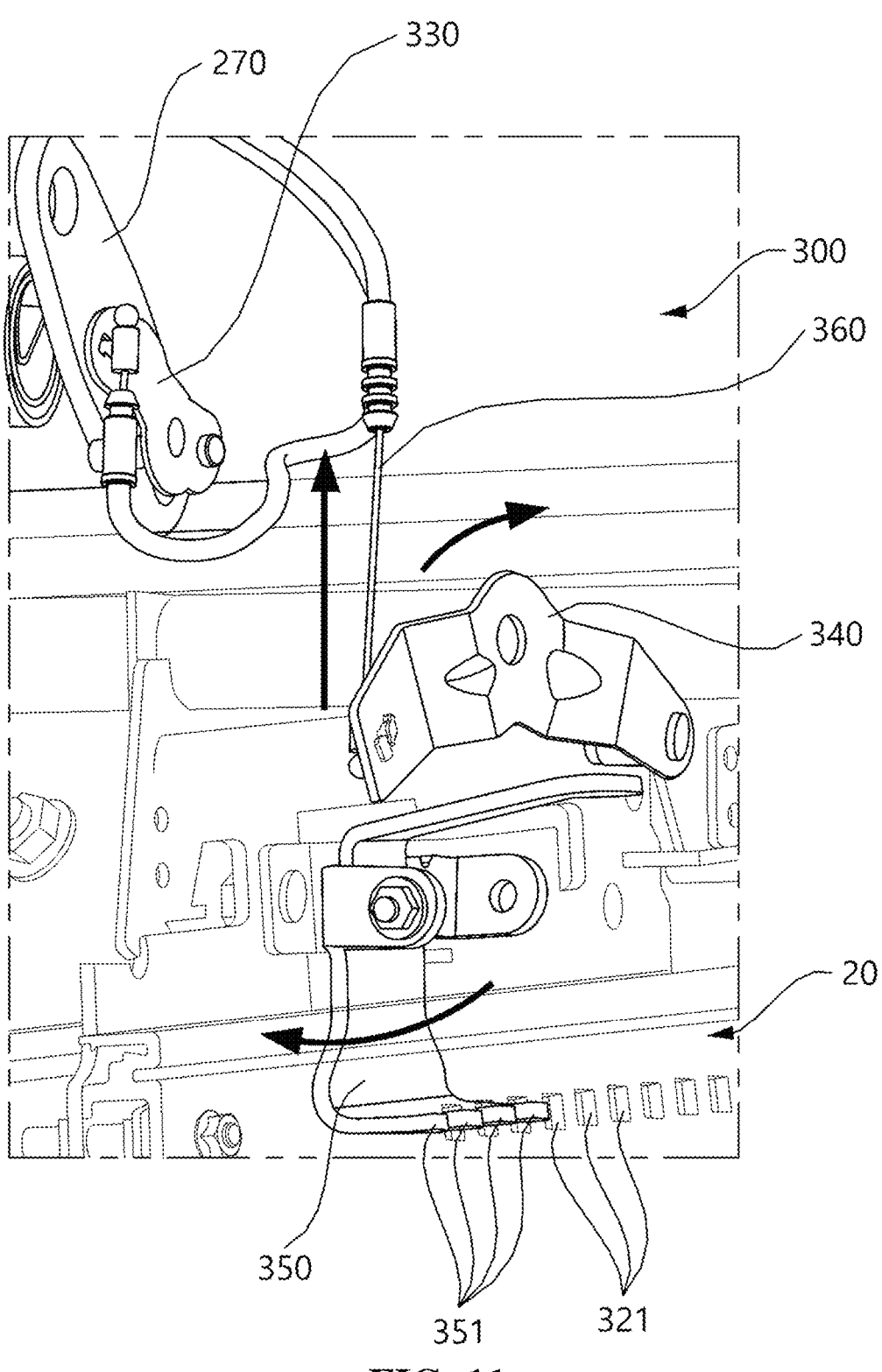
FIG. 11 is a diagram describing rotation of a sixth lever by a third cable and an operation of a seventh lever which interlocks with the sixth lever.
Figure 12:
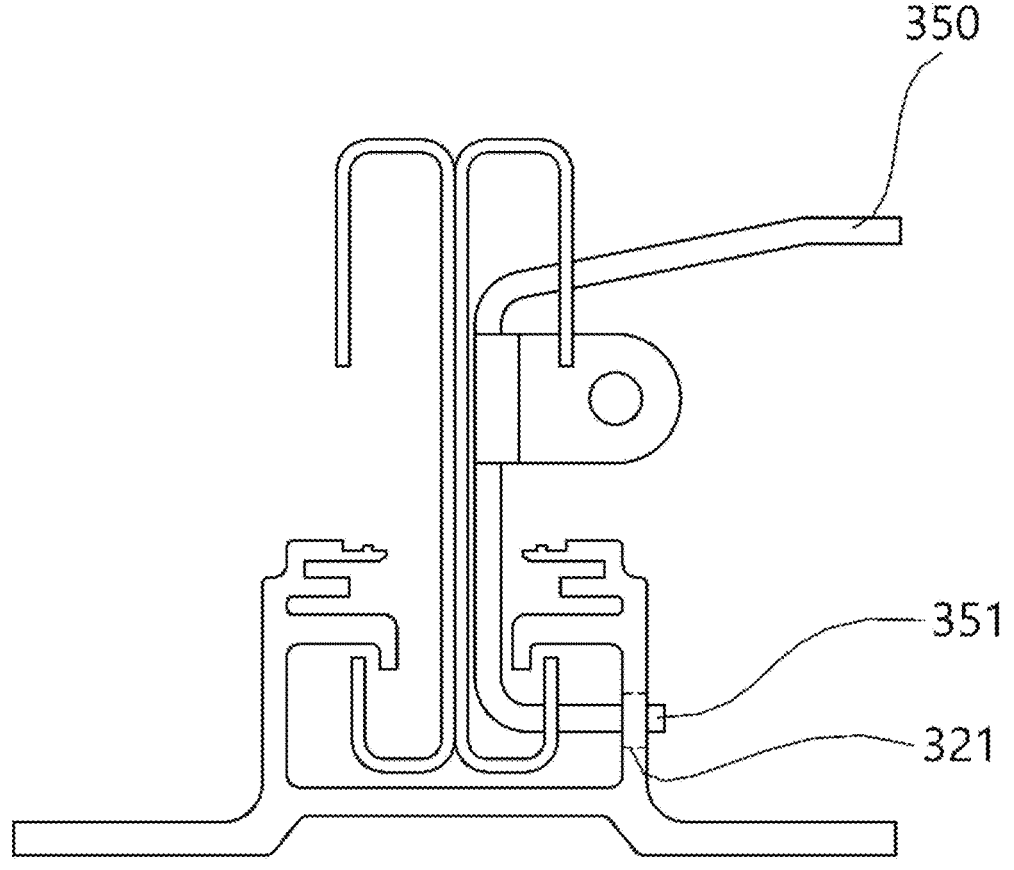
FIGS. 12 and 13 are diagrams describing that a restriction protrusion departs from a restriction groove while the seventh lever rotates.
Figure 13:
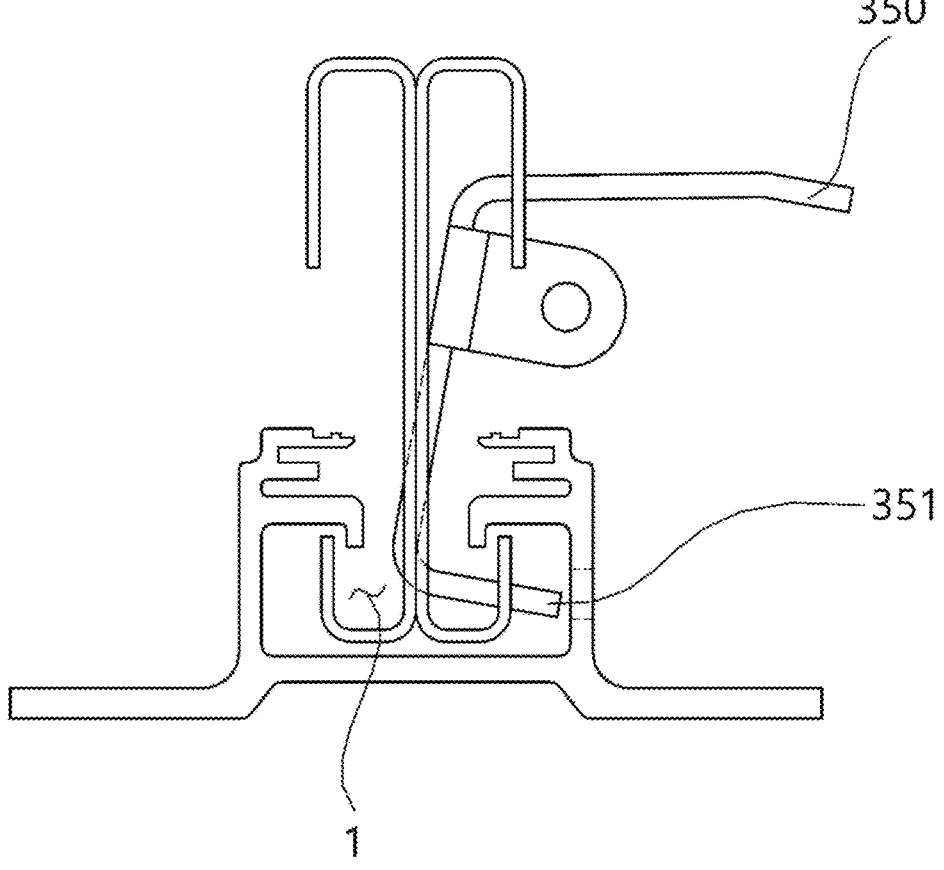
Figure 14:
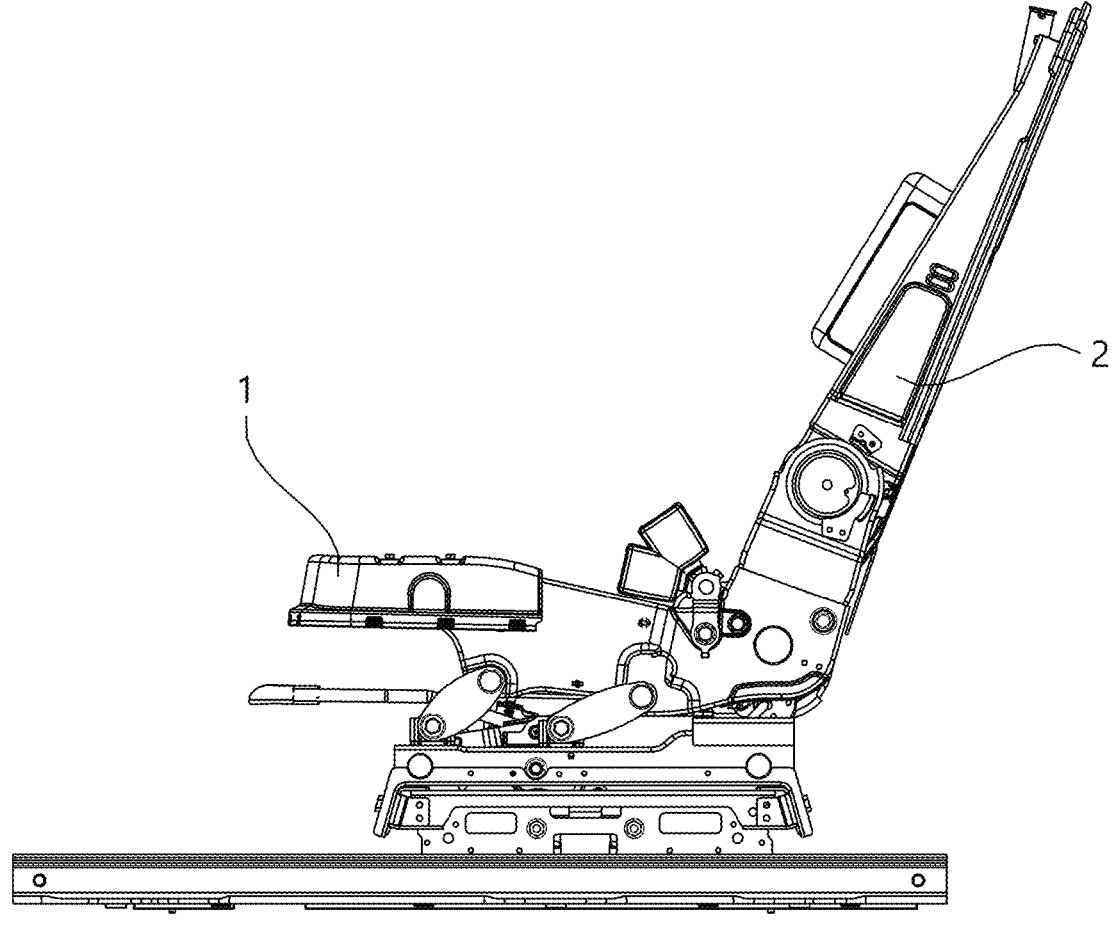
FIGS. 14 and 15 are diagrams comparing before and after an operation of the seat using the walk-in apparatus according to the exemplary embodiment.
Figure 15:
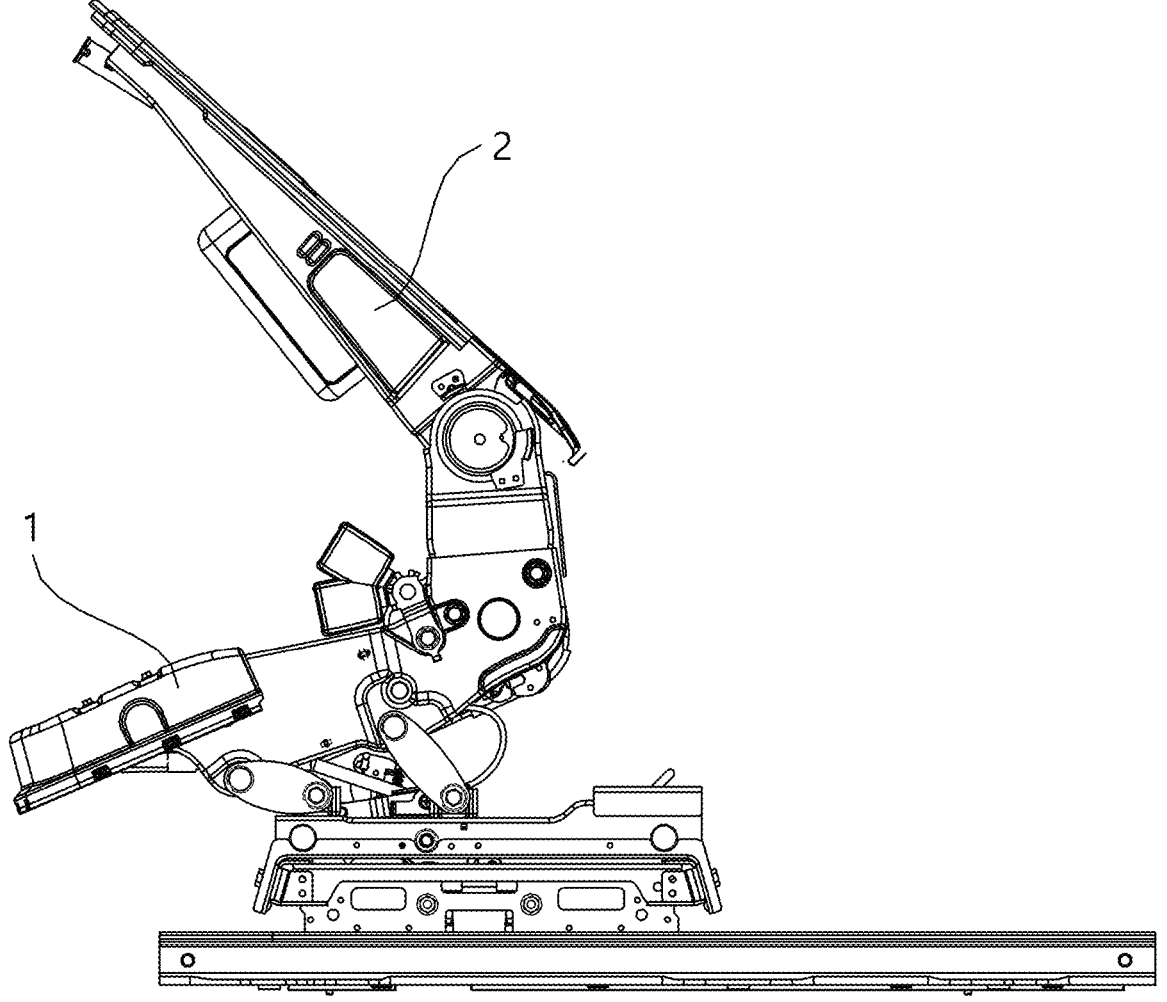

FIG. 3 is a diagram describing a walk-in apparatus according to an exemplary embodiment of the present invention, FIG. 4 is a diagram describing a relationship between a fixed rail and a movable rail, and a seat, FIG. 5 is a diagram describing rotation of a first lever by driving of an actuator and the resulting folding of a seat back, FIG. 6 is a diagram describing rotation of a second level and pulling of a second cable by the ration of the first level, FIG. 7 is a diagram describing rotation of a third lever and actuation of a switch by a second cable, FIG. 8 is a diagram illustrating a state in which a fourth lever is decoupled from a latch by the rotation of the third lever, FIGS. 9 and 10 are diagrams describing motions of a first link and a second link by driving of a motor, FIG. 11 is a diagram describing rotation of a sixth lever by a third cable and an operation of a seventh lever which interlocks with the sixth lever, FIGS. 12 and 13 are diagrams describing that a restriction protrusion departs from a restriction groove while the seventh lever rotates, and FIGS. 14 and 15 are diagrams comparing before and after an operation of the seat using the walk-in apparatus according to the exemplary embodiment.

The walk-in apparatus according to the exemplary embodiment may include an actuator 10, a fixed rail 20, a movable rail 30, a folding unit 100, a tilting unit 200, and a sliding unit 300.

The actuator 10 is driven by manipulation of a walk-in manipulation unit of a user to perform an operation of pulling a first cable 130. As illustrated in FIG. 3, the actuator 10 may be installed below a seat 1. The actuator 10 is operated by mechanically interlocking with the manipulation of the walk-in manipulation unit of the user, but may be electrically operated by the manipulation of the walk-in manipulation unit of the user. In an exemplary embodiment, the walk-in manipulation unit may be configured in a button or lever type, and provided at one side of the seat 1 or a seat back 2. In an exemplary embodiment, when the actuator 10 is a member which is electrically operated, such as a motor or a solenoid, the walk-in manipulation unit may be a button as a switch for operating the motor or solenoid.

Due to characteristics of a cable, force of pulling any one to the other one is transferred, but the force is not transferred even though the cable is pushed from any one side. A first cable 130, a second cable 220, and a third cable 360 to be described below are cables having the characteristics.

The walk-in manipulation unit for operating the actuator 10 is not illustrated, and may be installed on the seat 1 or the seat back 2, and an installation location is determined by considering the convenience of a vehicle user. In this case, the seat 1 is a part which supports a hip when a vehicle user sits, and the seat back 2 is a backrest.

As illustrated in FIG. 4, one pair of fixed rails 20 as rails which are fixed to a floor of a vehicle are provided, and one pair of fixed rails 20 are disposed to be in parallel to each other. A restriction groove 321 is installed in the fixed rail 20, which will be described below.

As illustrated in FIG. 4, the movable rail 30 is coupled to the seat 1 and moved forward and backward along the fixed rail 20 jointly with the seat 1. Hereinafter, a front refers to a forward direction of the vehicle and a rear means a backward direction of the vehicle.

Referring to FIGS. 3 and 5, the folding unit 100 as a component for folding the seat back 2 forward may include a recliner 110, a first lever 120, and the first cable 130.

The recliner 110 is a member which adjusts an angle of the seat back 2. The recliner 110 may include a spring, and the seat back 2 may be folded forward by elastic force of the spring provided in the recliner 110. The folding of the seat back 2 is restricted by a folding restriction means (not illustrated), and when the first lever 120 releases the restriction by the folding restriction means, the seat back 2 is folded forward by the spring provided in the recliner 110. The recliner 110 and the folding restriction means as components which restrict the folding of the seat back 2 may adopt a known means, so an additional description will be omitted.

The first lever 120 may be rotatably provided near the recliner 10, and when the actuator 10 pulls the first cable 130, the folding restriction of the seat back 2 by the folding restriction means is released while the first lever 120 is rotated, and rotational torque by the spring the recliner 110 is transferred to the seat back 2, which enables the seat back 2 to be folded forward.

The tilting unit 200 is a component that performs an operation of lifting a rear side of the seat 1 up, and the seat 1 may be rotated so that a rear side is moved up rather than a front side by actuating the tilting unit 200.

Referring to FIG. 3, the tilting unit 200 may include a second lever 210, a second cable 220, a third lever 230, a switch 50, a latch 40, a fourth lever 240, a motor 250, a first link 260, and a second link 270. In an exemplary embodiment, each one of the third lever 230, the latch 40, the fourth lever 240, the first link 260, and the second link 270 may be installed at each of both sides of the seat 1.

Referring to FIGS. 5 and 6, the second lever 210 is rotatably coupled to a lower portion of the first lever 120, and interlocks with the first lever 120. In an exemplary embodiment, one end portion 122 of the first lever 120 and one end portion 212 of the second lever 210 are in contact with each other, so the end 122 of the first lever may transfer rotation driving force to the end 212 of the second lever 210 when the first lever 120 rotates. Interlocking means that when any one component of two components moves or rotates, the other component also moves or rotates jointly, and is described below.

Meanwhile, in FIG. 6, it is illustrated that the second lever 210 rotates in an opposite direction to the first lever, and such a configuration is to conveniently connect the second lever 210 and the second cable 220, and the second lever 210 should not particularly rotate in the opposite direction to the first lever 120, and rotational directions of the first lever 120 and the second lever 210 may also be the same as each other.

The second cable 220 is a cable in which one end is coupled to the second lever 210, and is pulled when the second lever 210 rotates. The other end of the second cable 220 is coupled to a pair of third levers 230. Referring to FIGS. 3, 7, and 8, the other end of the second cable 220 is coupled to the third lever 230 in a state in which one end of the second cable 220 is coupled to the second lever 210. When the latch 40 and the fourth lever 240 are provided at a left side and a right side of the seat, respectively, two third levers 230 may be provided each of the left side and the right side, and the other end of the second cable 220 may be branched into two in order to actuate the third levers 230 at the left side and the right side.

The third lever 230 as a component rotatably coupled to the seat is connected to the other end of the second cable 220, and rotates when the second cable 220 is pulled.

Referring to FIGS. 7 and 8, a switch 50 may be turned on when the third lever 230 is in contact with the switch 50 while the third lever 230 rotates, and installed in any one of a pair of third layers 230. The switch 50 may be configured by a mechanical switch actuated by the rotation of the third lever 230. The switch 50 may send a driving signal to a motor 250 to be described below and may send a signal for releasing force of pulling the first cable 130 by the actuator 10, and this means that force opposite to the force of pulling the first cable 130 is applied (pushed), and since the force is transferred to the first lever 120 even though the first cable 130 is pushed as described above, the first lever 120 does not rotate in the opposite direction to the direction when pulling the first cable 130.

The latch 40 as a component for fixing the rear side of the seat 1 may be configured in a state in which both ends of the latch 40 are fixed to the lower portion (e.g., an upper end of the movable rail 30) of the seat 1 similar to a bent "C" shape. A pair of latches 40 may be provided at the left and right sides of the seat 1.

The fourth lever 240 as a component that interlocks with the third lever 230 is caught on the latch 40 to prevent the seat 1 from being tilted as illustrated in FIG. 7, and when the third lever 230 rotates, the fourth lever 240 interlocks with the third lever 230 to be decoupled from the latch 40, and to allow the seat 1 to be tilted. In FIG. 8, a state in which the fourth lever 240 and the latch 40 are decoupled from each other is illustrated.

The motor 250 is driven when the switch 50 is turned on.

Referring to FIGS. 3 and 9, one end of the first link 260 is coupled to a front side of the movable rail 30, and the other end is coupled to the front side of the seat 1. The first links 260 provided at both sides of the seat 1 are connected through a driving rod 251 to connect the seat 1 and the movable rail 30. The driving rod 251 is connected to an actuation link 252 which is actuated forward and backward by the motor 250, and when the action link 252 moves forward, the driving rod 251 rotates, and while the first link 260 rotates around the end coupled to the movable rail 30 on the axis, the seat 1 moves forward and the rear side of the seat 1 is lifted up.

One end of the second link 270 is coupled to a rear side of the movable rail 30, and the other end is coupled to the rear side of the seat 1, and the rear side of the seat 1 is lifted up while the second link 270 rotates simultaneously when the first link 260 rotates while the seat 1 moves forward. To this end, the second link 270 may be formed to be longer than the first link 260. FIG. 9 illustrates a state before the seat 1 is tilted as in a state illustrated in FIG. 14 as a state before the first link 260 and the second link 270 rotate, and FIG. 10 illustrates a state in which the seat 1 is tilted as illustrated in FIG. 15 as a state in which the first link 260 and the second link 270 rotate.

Referring to FIGS. 4 and 11, the sliding unit 300, which is to simultaneously slide the seat 1 and the seat back 2 forward, includes a forward pressing unit 310, a sliding restriction means, the fifth lever 330, the sixth lever 340, and the third cable 360.

The front pressing unit 310 as a component that presses the movable rail 30 coupled to the seat 1 to slide forward may adopt a coil spring in which one end is fixed to the fixed rail 20 and the other end is fixed to the movable rail 30 as illustrated in FIG. 4. As illustrated in FIGS. 4 and 14, the coil spring is stretched (elastically transformed) before the seat 1 slides.

The sliding restriction means as a component that restricts sliding of the movable rail 30 includes restriction grooves 321 which are grooves formed in the fixed rail 20 at a predetermined interval in a longitudinal direction of the fixed rail 20, and a sixth lever 340.

As illustrated in FIG. 12, the restriction groove 321 may also be manufactured in the form of a through-hole.

The seventh lever 350 includes a restriction protrusion 351 inserted and coupled into the restriction groove 321. There may be several restriction protrusions 351.

The fifth lever 330 interlocks with the first link 260 or the second link 270. In an exemplary embodiment, referring to FIG. 10, the fifth lever 330 is provided at the upper portion of the movable rail 20, and when the seat 1 is tilted as the first link 260 and the second link 270 rotate in the clockwise direction in FIG. 10, the fifth lever 330 is configured to rotate as an operation protrusion 332 is pressed by the second link 270. In the exemplary embodiment of the present invention, the fifth lever 330 is also enabled to be rotated by the rotation of the first link 260, of course.

The sixth lever 340 interlocks with the fifth lever 330 to release the restriction of the sliding by the sliding restriction means. Referring to FIG. 11, the fifth lever 330 is connected to the sixth lever 340 by the third cable 360, and while the fifth lever 330 rotates, the third cable 360 is pulled to rotate the sixth lever 340.

When the sixth lever 340 rotates, the seventh lever 350 rotates in a direction in which the restriction protrusion 351 of the seventh lever 350 departs from the restriction groove 321.

FIG. 12 illustrates a state in which the restriction protrusion 351 of the seventh lever 350 is inserted into the restriction groove 321, and FIG. 13 illustrates a state in which the seventh lever 350 rotates so that the restriction protrusion 351 departs from the restriction groove 321.

When the restriction protrusion 351 departs from the restriction groove 321, the movable rail 30 and the seat 1 slide forward by elastic restoration force of the coil spring which is the front pressing unit 310.

Meanwhile, the fifth lever 330 and the sixth lever 340 may also be configured to directly interlock with each other, and the reason is that because the sixth lever 340 is installed in contact with the fixed rail 20, and the fifth lever 330 is installed at the movable rail 30 side, the fifth lever 330 and the sixth lever 340 interlocking by the third cable 360 is more advantageous than the fifth lever 330 and the sixth lever 340 directly interlocking with each other.

Hereinafter, by describing the method for driving the seat 1 and the seat back 2 by the walk-in apparatus according to the above-described configuration, a function, an action, and an effect each configuration described will be described.

In order for the user of the vehicle to drive the seat 1 and the seat back 2 from the state illustrated in FIG. 14 to the state illustrated in FIG. 15 boarding, the walk-in manipulation unit (not illustrated) is manipulated to drive the actuator 10. The actuator 10 pulls the first cable 130 to rotate the first lever 120, and the restriction of the folding restriction means is released while the first lever 120 rotates, and as a result, the recliner 110 folds the seat back 2. As described above, since the recliner 110 and the folding restriction means may adopt known components, a description of a folding mechanism by the recliner 110 will be omitted.

When the first lever 120 rotates, the second lever 210 rotates jointly by interlocking with the first lever 120. As illustrated in FIG. 6, when the second lever 210 rotates, the second cable 220 is pulled, and when the second cable 220 is pulled, the third lever 230 connected to the second cable 220 rotates as illustrated in FIG. 8.

While the third lever 230 rotates, the switch 50 is turned, and the fourth lever 240 interlocking with the third lever 230 rotates. When the fourth lever 240 rotates, the fourth lever 240 and the latch 40 are decoupled from each other.

While the motor 250 rotates by the driving signal of the switch 50 in the state in which the fourth lever 240 and the latch 40 are decoupled from each other, the seat 1 is tilted while the first link 260 and the second link 270 rotate as illustrated in FIG. 9.

The first link 260 rotates in the process in which the seat 1 is tilted, and as illustrated in FIG. 11, the fifth lever 330 rotates jointly while the first link 260 rotates, and the sixth lever 340 rotates while interlocking with the fifth lever 330 to pull the third cable 360 (a direction in which the third cable 360 is pulled is marked with an upward arrow in the drawing).

When the third cable 360 is pulled, the seventh lever 350 rotates as illustrated in FIG. 11 (a rotational direction of the seventh lever 350 is marked with a bottommost arrow).

While the seventh lever 350 rotates, the restriction protrusion 351 departs from the restriction groove 321 as illustrated in FIG. 13, and when the restriction protrusion 351 departs from the restriction groove 321, the seat 1 slides forward by the elastic restoration force of the coil spring which is the front pressing unit 310, and becomes the state illustrated in FIG. 15.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A walk-in apparatus provided in a vehicle seat, comprising:

an actuator configured to be driven by manipulation of a walk-in manipulation unit;

a folding unit configured to be actuated by the actuator to fold a seat back forward;

a tilting unit interlocking with actuation of the folding unit and configured to tilt a rear side of the vehicle seat; and a sliding unit interlocking with the tilting unit and configured to move the vehicle seat forward, wherein the folding unit includes a first lever configured to be rotated by a first cable connected to the actuator and configured to release folding restriction of a recliner provided in the seat back, wherein the tilting unit includes a second lever in contact with one end of the first lever and configured to be rotated by a rotation of the first lever, a second cable configured to be pulled by a rotation of the second lever, and a third lever connected to the second cable and configured to be rotated when the second cable is pulled, and wherein the tilting unit is configured to be tilted as the rear side of the vehicle seat is separated from a latch by a rotation of the third lever.

2. The walk-in apparatus of claim 1, wherein the recliner includes a spring configured to provide force to fold the seat back.

3. The walk-in apparatus of claim 1, wherein a pair of third levers are disposed at left and right sides of the vehicle seat, and wherein the second cable has one end connected to the second lever and another end branched to correspond to the third lever.

4. The walk-in apparatus of claim 1, wherein the tilting unit further includes a fourth lever in contact with one end of the third lever and configured to be rotated and decoupled from the latch by the rotation of the third lever, a switch actuated by a rotation of the fourth lever, and a motor driven by the switch and configured to tilt the vehicle seat.

5. The walk-in apparatus of claim 4, wherein the vehicle seat is driven by the motor, and includes a first link having one end rotatably coupled to a front side of a movable rail and another end coupled to a front bottom portion of the vehicle seat, and a second link having one end rotatably coupled to a rear side of the movable rail and another end coupled to a rear bottom portion of the vehicle seat.

6. The walk-in apparatus of claim 5, wherein the sliding unit includes a front pressing unit configured to press the movable rail to which the vehicle seat is coupled to slide to a front which is a driving direction of a vehicle, a sliding restriction means configured to restrict sliding of the movable rail, a fifth lever interlocking with the first link or the second link, and a sixth lever interlocking with the fifth lever and configured to release sliding restriction by the sliding restriction means.

7. The walk-in apparatus of claim 6, wherein the sliding restriction means includes:

restriction grooves defined at a predetermined interval in a longitudinal direction of a fixed rail in which the movable rail slides, and a seventh lever including restriction protrusions inserted and coupled into the restriction grooves, and rotatably coupled to the movable rail, and wherein the seventh lever rotates in a direction in which the restriction protrusions of the seventh lever depart from the restriction grooves by the rotation of the sixth lever to release the sliding restriction.

8. The walk-in apparatus of claim 7, further comprising:

a third cable having one end coupled to the sixth lever and another end coupled to the seventh lever, wherein the seventh lever is configured to rotate as the third cable is pulled by the rotation of the sixth lever.

9. The walk-in apparatus of claim 4, wherein when the switch is turned on, the actuator is driven to release pulling force applied to the first cable.

* * * * *